Aug. 7, 1928.  A. L. HOOKER  1,679,422
SPARE TIRE CARRIER
Filed Feb. 14, 1927   2 Sheets-Sheet 1
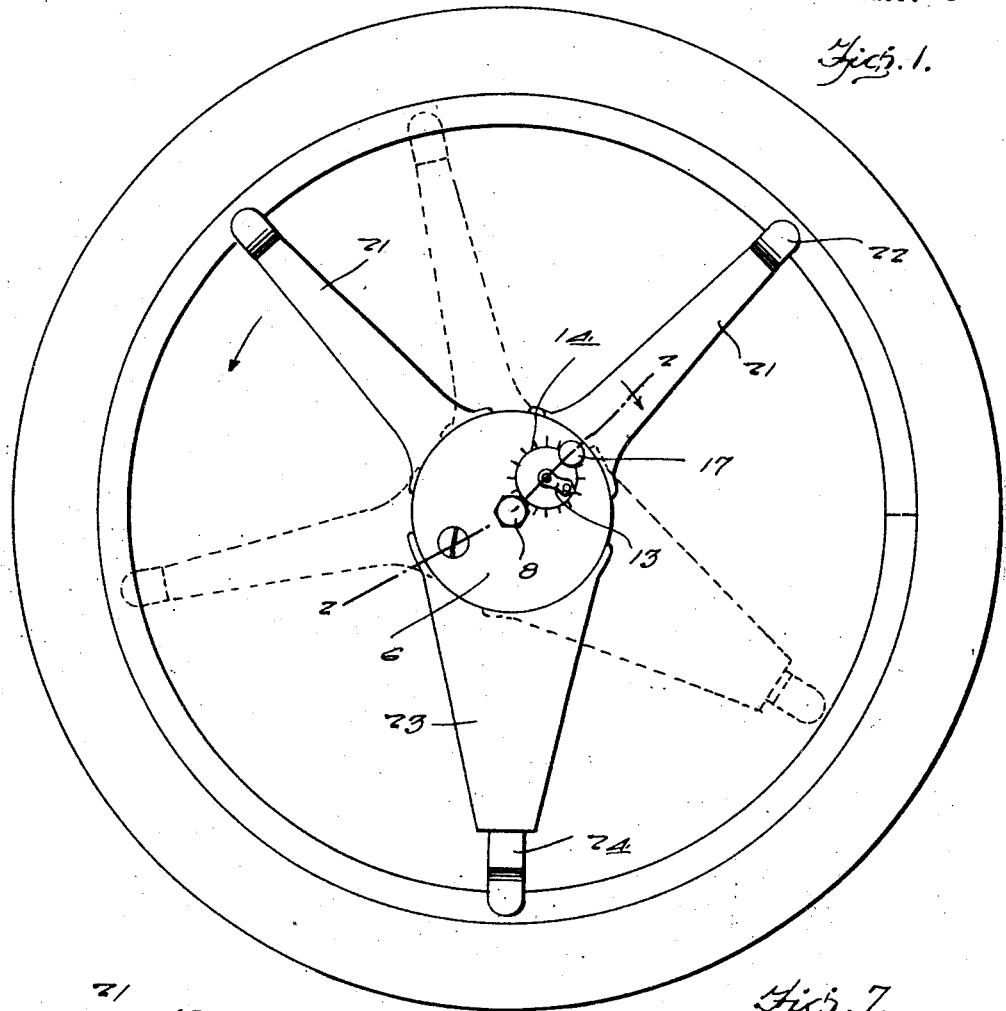
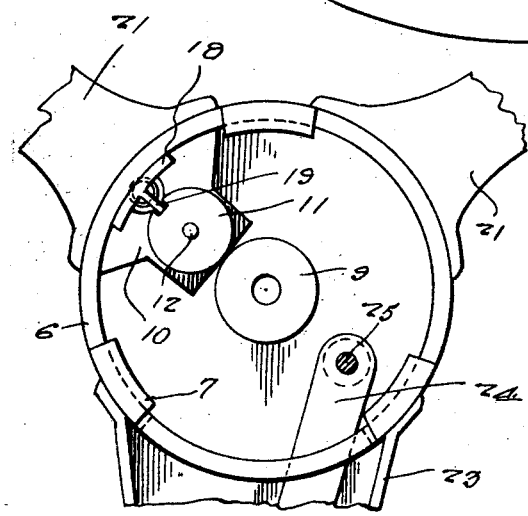
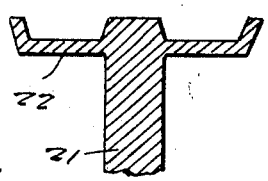
Inventor
Arthur L. Hooker
By Clarence A. O'Brien
Attorney

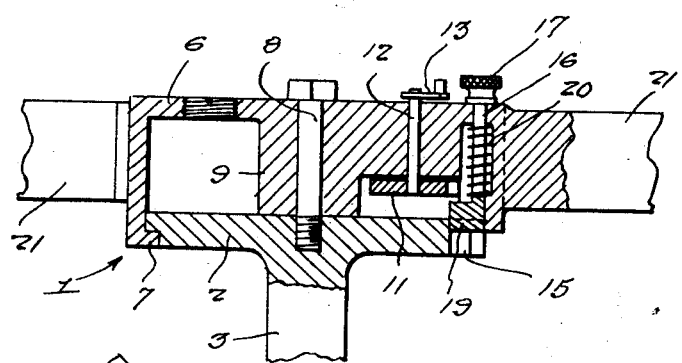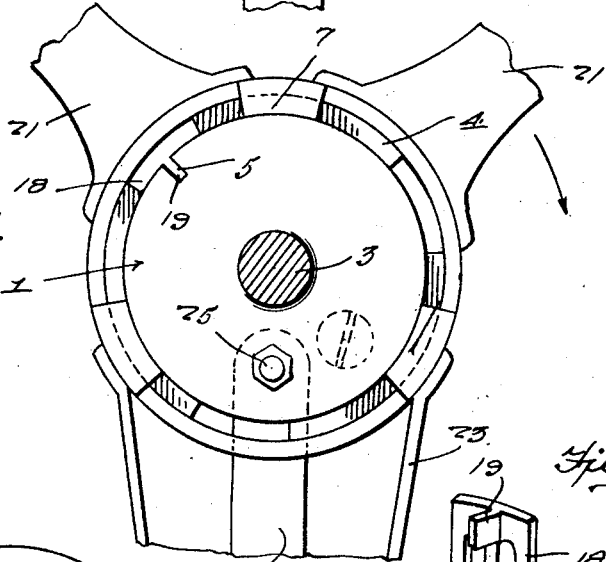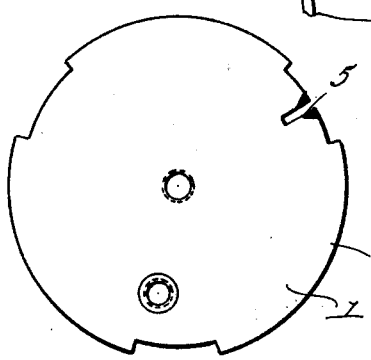

Patented Aug. 7, 1928.

1,679,422

UNITED STATES PATENT OFFICE.

ARTHUR L. HOOKER, OF WELLINGTON, KANSAS.

SPARE-TIRE CARRIER.

Application filed February 14, 1927. Serial No. 168,214.

This invention relates to an improved form of spare tire carrier for use more particularly upon automobiles.

The ordinary type of carrier usually includes a spider structure made up of radiating arms having rim clamps at their outer ends for engaging the tire rim. The spider is rigidly mounted upon the rear end of the automobile body and under most conditions a key controlled locking device is employed for holding the tire in place. In some instances, however, the construction is such as to require the use of a wrench in removing clamping bolts such as serve to hold the tire in place.

With structures of the foregoing type, an operator frequently finds himself in a predicament. For instance, where a padlock is used, it is frequently quite rusty and difficult to unlock. Sometimes, the key is misplaced, and it becomes necessary to batter and literally rip the lock off. Where clamping bolts are used, a wrench is required, and frequently the operator finds that the wrench required has been lost or misplaced or stolen. Even when a wrench is handy, it frequently happens that odd-sized nuts are employed, making the wrench on hand practically useless.

What I propose is a structure which obviates the necessity of padlocks and clamping bolts, thereby making it unnecessary to use keys and wrenches.

Briefly, my improved structure comprises a new kind of a spider which includes a novel hub structure made up of stationary and rotatable parts, together with radiating rim engaging arms, two of which are rigid, and one of which is retractible, the arrangement being such that upon rotating the spider, the retractible arm will move inwardly sufficiently far to allow the tire and rim to be readily removed.

In addition, I provide a novel combination retaining device, making it necessary to know the setting in order to rotate the rotary part of the spider to bring about the aforesaid retractible action and subsequent releasing of the spare tire.

The specific details forming the alleged novelty, will become more readily apparent from the following description and drawings.

In the accompanying drawings forming a part of this application, and in which like numerals are employed to designate like parts throughout the same:—

Figure 1 is a rear elevation of the improved carrier, showing the spare tire mounted thereon, and indicating, in dotted lines, the rotary action of the carrier.

Fig. 2 is an enlarged fragmentary sectional view of the hub structure.

Fig. 3 is a view observing the structure in Fig. 2, from the bottom up.

Fig. 4 is a view showing the rotary part of the hub structure disconnected from the stationary part.

Fig. 5 is an inside view of the stationary part of the hub structure.

Fig. 6 is a perspective view of one of the details of the retaining means.

Fig. 7 is a view of a double rim clamp used when two spare tires are employed.

Attention is first invited to Fig. 2 wherein it will be seen that the hub construction 1 includes a relatively stationary disk 2 carried on a stationary mounting arm. The arm 3 is of suitable construction and is connected with a body of the vehicle in any appropriate manner.

The disk 2 is provided with circumferentially spaced segmental portions 4 and it further is provided with a notch 5 at a predetermined point forming a keyway. The relatively movable part 6 is in the form of a hollow circular casing, the rim of which is provided with inturned lugs 7 slidably engaging the segments 4. This part 6 is rotatable about the pivot forming bolt 8. In this connection it will be noted that the central portion of the casing is thickened somewhat as at 9 to form a spacing and guide sleeve which surrounds the pivot bolt.

Moreover, on one side, of this guide is a thickened sector 10 of the outline represented better in Fig. 4. This sector 10 constitutes a mounting for a tumbler 11 carried by the rotating shaft 12. This tumbler is provided at its periphery and at a predetermined point with a notch adapted to register with the keyway 5. The shaft 12 extends through the top of the casing and carries an indicating pointer 13 which cooperates with the graduated dial 14. Incidentally, it is necessary for the operator to know the particular graduation on the dial which serves to register the notch in the tumbler with the keyway 5 in the disk 2.

Closely associated with these details is a slidable retainer 15 of the design represented in Fig. 6. This retainer comprises a stem 16, an operating knob 17, an arcuate plate portion 18, and an outstanding lug 19 which forms a key for reception in the keyway 5. Again, it should be noted that the lug 19 is of a size to prevent it from being withdrawn from the keyway 5 until the notch in the tumbler 11 is in proper alinement.

The portion 10 is constructed to accommodate the sliding stem 16 and plate portion 18. A coiled spring 20 cooperates to normally hold the retainer in the position shown in Fig. 2.

Carried by the rotary casing 6 is the spoke structure which includes two rigidly mounted spokes 21 constructed at their outer ends to provide rim engaging heads 22 and a hollow tapered casing 23. The casing 23 constitutes a housing for the arm or retractible spoke member 24 which is pivotally connected as at 25 to the aforesaid disk 2. The pivotal connection is eccentrically located with respect to the axis of rotation. This spoke member 24 is also provided with means at its outer end to engage the rim.

The operation of the device is as follows. Assuming first that the spare tire is fitted on the device as represented in Fig. 1, and that it is desired to remove the spare tire, it will be seen that this is accomplished in this way. First, it is necessary for the operator to known that when the indicator 13 is opposite a predetermined graduation on the scale 14, this will bring the notch in the tumbler plate 11 into registry with the keyway 5. Hence, the indicator 13 is grasped and the shaft 12 is turned to accomplish this result.

Now the knob 17 is grasped and the stem 16 is pulled upwardly against the tension of the spring 20. This allows the lug 19 to be withdrawn from the keyway 5 and into the notch in the tumbler plate. Now, the rotary part of the structure can be turned with respect to the stationary part 2 about the pivot 8 and in an obvious manner. It follows that when this rotation takes place, the eccentric pivotal connection of the retractible arm or spoke member 24 causes the distance between the outer end thereof and the axis of rotation to be shortened, as represented in Figs. 1 and 4 as compared to Fig. 3. Hence, when the structure takes the position represented in dotted lines in Fig. 3, sufficient clearance is provided to allow the spare tire to be easily lifted off of the carrier.

It is thought that by considering the detailed description in connection with the drawings, a clear understanding of the invention and operation of the same will be had. Therefore, a more lengthy description is thought unnecessary.

While the preferred embodiment of the invention has been shown and described in detail, it is to be understood that minor changes in the shape, size, proportion and rearrangement may be resorted to within the scope of the adjoined claim.

As before indicated, the structure represented in Fig. 7 is simply a fragmentary sectional view showing the rim engaging means of one of the spokes constructed to accommodate two spare tires. This type of spoke may be employed in lieu of the single type previously described.

Having thus described my invention, what I claim as new is:—

In a tire carrier of the class described, a supporting arm, a disk rigidly mounted on said arm, peripheral segments formed on said disk, a hollow casing structure, means pivotally connecting said casing to said disk for rotation about the disk, lugs carried by said casing and in slidable contact with said segments, a pair of rigid spoke members carried by said casing and radiating therefrom and provided with rim engaging means, an additional spoke member having eccentric pivotal connection with said disk, and a tubular housing rigidly mounted on said casing and enclosing said additional spoke member, the latter being also provided with rim engaging means at its outer end.

In testimony whereof I affix my signature.

ARTHUR L. HOOKER.